Nov. 20, 1962
H. G. COLMER, JR
3,065,007
TAKE-UP DEVICE
Filed Jan. 2, 1962
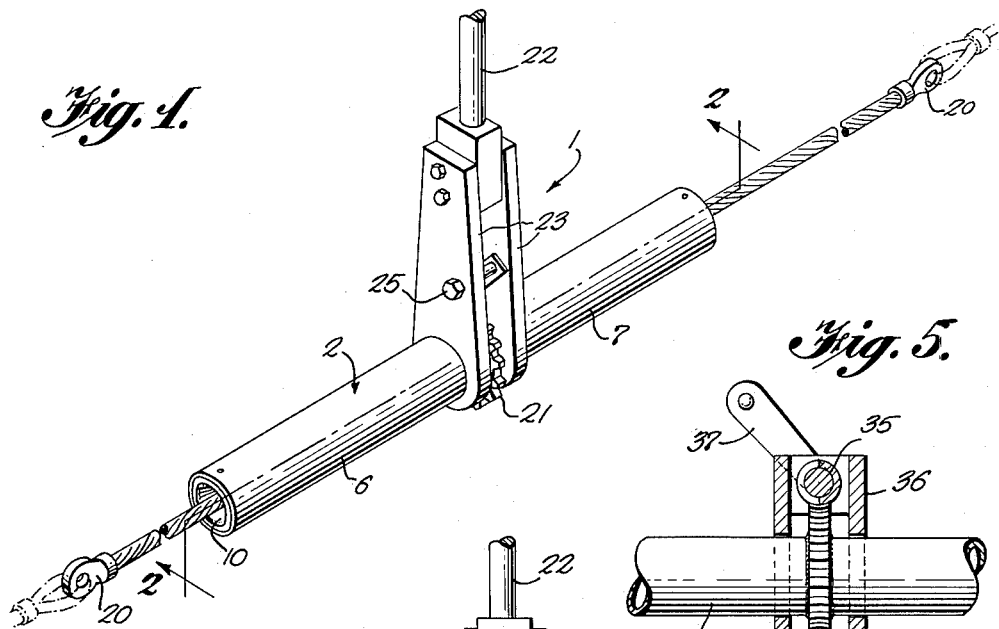
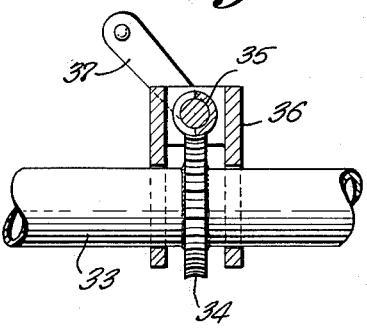
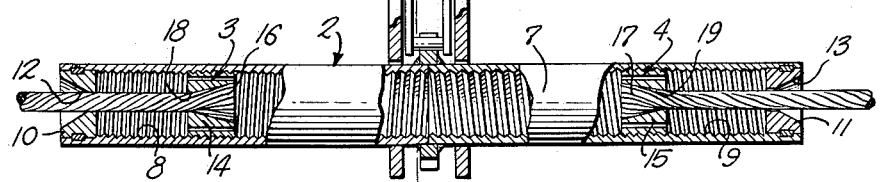
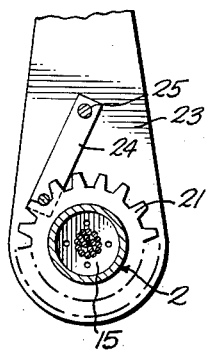
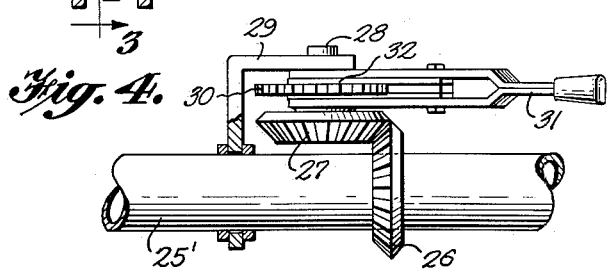
INVENTOR
*Henry G. Colmer, Jr.*
BY *Mason, Fenwick & Lawrence*
ATTORNEYS United States Patent Office 3,065,007
Patented Nov. 20, 1962

3,065,007
TAKE-UP DEVICE
Henry G. Colmer, Jr., 4203 Belvedere St., Mobile, Ala.
Filed Jan. 2, 1962, Ser. No. 164,432
5 Claims. (Cl. 287—60)

This invention relates to take-up devices, and particularly to devices of this kind which are adaptable to removing slack from connecting lines, load tying lines, etc.

It has been common practice to employ turnbuckles as take-up devices in brace rods, connectors, and similar members, but these have certain limitations. Turnbuckles employ a pair of stiff, rigid rods which limit their use to straight line installations. The rigid rods are awkward to handle, particularly if long. If breakage in the rods occurs, a new rod at considerable expense must be obtained. A rod of proper size is often difficult to obtain, especially in outlying regions.

The principal object of the present invention is to provide a take-up device which will have considerably more flexibility than those previously used while having equal holding qualities.

A more specific object is the provision of a take-up device of this character which will be capable of tightening a line which does not follow a straight line from its end points of attachment.

Another object is to provide a take-up which will tension a line which contains bends, but all tension strain upon the take-up itself will be in a straight line axially of the device.

A further object is the provision of such a device wherein the tension members may be replaced free upon breakage, usually from materials at hand.

Still another object of the invention is to provide a take-up device which is of the screw type wherein the screw threads are protected and all threaded areas may be grease packed.

Yet a further object is to provide a take-up device that will be capable of operation with several oscillatory, or rotatory, motions, or a combination of the two.

It is also an object of the invention to provide a take-up which will be exceptionally efficient, yet easy to manufacture and operate, and low in cost.

Other objects of the invention will become apparent from the following description of several practical embodiments thereof, when taken in conjunction with the drawings which accompany, and form part of, this specification.

In the drawings:

FIGURE 1 is a perspective view of a take-up device embodying the principles of the present invention;

FIGURE 2 is a longitudinal section taken on the line 2—2 of FIGURE 1;

FIGURE 3 is a vertical section taken on the line 3—3 of FIGURE 2;

FIGURE 4 is a view similar to FIGURE 2 illustrating a modified actuating means; and FIGURE 5 is a view similar to FIGURE 2 showing still another form of operating means.

In general, the take-up device of the present invention takes the form of a cylindrical barrel, interiorly threaded, and having oppositely moving nuts mounted within it. Cables are attached to the nuts and extend outward through fairlead guides in the ends of the barrel to permit deflection of the cables in any direction. Means are provided for rotating the barrel to move the nuts toward and from one another.

Referring to the drawings in detail, and first turning to that form of the invention shown in FIGURES 1 to 3, the take-up device 1 consists of a barrel 2 having tensioning members 3 and 4 connected thereto, and barrel rotating means 5 to cause the tensioning means to move toward and from one another.

The barrel 2 is in the form of an elongated cylinder, or tube, which may be made of two similar sections 6 and 7, butt welded in axial alignment. The two sections will be interiorly threaded along their entire lengths, as at 8 and 9, one right hand and one left hand. The outer ends of the barrel are unthreaded and have guides 10 and 11 seated in them. The guides have central openings 12 and 13 which are cone-shaped, flaring outwardly.

The tension members 3 and 4 consist of nuts 14 and 15 having the ends of cables 16 and 17 anchored to them. The nuts are externally threaded to match the threads in the cylindrical section of the barrel in which they are to operate. Each nut has a central opening, and the openings 18 and 19 are tapered inwardly of the barrel. The cable ends are inserted in the openings, and the ends are then splayed and leaded to prevent their withdrawal from the nuts.

It is contemplated that the cables to be used will be twisted steel wire cables. It is important that cable having a left-hand twist, or lay, be connected to the nut to run on the left-hand thread of the barrel, and that right-hand twist, or lay, cable be used with the nut in the right-hand threaded section of the barrel. This is to insure rotation of the barrel in the direction of cable twist as tension is increased during take-up- as will appear.

The cables extend from the nuts through the guide openings 12 and 13 in the guides 10 and 11. The inner ends of the guide openings surround the cables closely, while permitting free axial movement of the cable through the guide. This positions that part of the cable between the guide and the nut to which it is attached coaxial to the barrel so that all pull on the cable in the barrel will be directly along the barrel axis. Because of the flaring openings in the guides, the cables are free to flex, or bend, in any direction outside of the barrel. This permits the device to be used to take up tension in lines securing at different angles, or those passing around objects to be secured. Each cable has a clevis 20 fixed to its outer end so that it may be attached to an anchoring cable, or line, to be tensioned.

The barrel is fitted with a ratchet wheel 21 at its midpoint, and the wheel is fixed to the barrel. An operating level 22 has spaced legs 23 journalled on the barrel to allow free pivotal movement of the level about the barrel. The legs of the lever are on opposite sides of the ratchet wheel, and a pawl 24 is pivotally mounted between the legs on pivot pin 25 for coaction with the teeth of the ratchet. It is obvious that rocking the lever will cause the barrel to rotate in steps and the nuts to move along the threads in the barrel. The pawl can be thrown to either side so that the barrel can be rotated in either direction as desired.

When the take-up device is connected in a line to be tensioned by connection of the line ends to the clevises 20, slack can be taken out of the line and the line tensioned by rocking the lever 22. This will rotate the barrel. As the rotation of the barrel during tensioning is in the direction of twist of the cables 16 and 17 the cables will resist turning motion and hold the nuts against rotative movement. Thus, the nuts will be caused to advance along the threaded barrel toward one another to draw in the cables and tighten the line. When it is desired to loosen the line, the pawl position may be reversed and an opposite operation will take place.

In FIGURE 4, a different barrel-rotating mechanism is shown. In this form, barrel 25' carries a bevel gear 26 in place of the ratchet. A second bevel gear 27, in mesh with gear 26, is mounted on a shaft 28 journalled in a bracket 29 rotatably mounted on the barrel. Shaft 28 also carries a ratchet 30, and both gear 27 and ratchet 30 are fixed to the shaft. A lever 31, similar to lever 22 of the previous form, is rockably supported on the shaft, and carries a pawl 32 for cooperation with the ratchet. This form operates in the same manner as the first form, but the operating force is applied in the direction tension is to be applied rather than across the tension direction. This latter form has some advantages not present in the first-described form.

In FIGURE 5, a still further modification is shown. Here, the barrel 33 carries a worm wheel 34, and a worm 35 is mounted in a bracket 36, supported on the barrel. The worm is in mesh with the worm wheel, and is rotated by a suitable handle, or crank 37. Here, again, the action of the take-up device is the same. In this form, the added advantage of rotary operating force is had.

While in the above several practical embodiments of the invention have been disclosed, it will be understood that the structural details shown and described are merely by way of example, and the invention may take other forms within the scope of the appended claims.

What is claimed is:

1. A take-up device comprising, an elongated cylindrical barrel interiorly threaded from a mid-point to points near its ends in opposite directions dividing the barrel into oppositely threaded sections, a nut in each section in engagement with the threads therein, a length of cable connected to each nut and projecting from the ends of the barrel, cable guides in the unthreaded ends of the barrel, the guides having outwardly diverging conical openings coaxial with the longitudinal axis of the cylindrical barrel to allow angular deflection of the cables emerging from the barrel while maintaining the cable lengths within the barrel between the guides and the nuts coaxial to the barrel, an operating handle, and means interconnecting the handle and barrel to cause rotation of the barrel when the handle is moved to cause the nuts to move toward and from one another.

2. A take-up device as claimed in claim 1 wherein the cables are of twisted strands and the lay of each cable is in a direction to cause tightening of the strains when the barrel is rotated to draw the nuts toward one another.

3. A take-up device as claimed in claim 1, wherein the means interconnecting the handle and barrel comprises, a ratchet wheel fixed to the barrel, the handle being mounted on the barrel for rocking movement thereon about the longitudinal axis of the barrel, and a pawl pivotally connected to the handle and having a free end for operative association with the ratchet wheel.

4. A take-up device as claimed in claim 1, wherein the means interconnecting the handle and barrel comprises, a bevel gear fixed to the barrel, a bracket mounted on the barrel and carrying a shaft mounted normal to the central longitudinal axis of the barrel, a bevel gear fixed to the shaft in mesh with the bevel gear on the barrel, a ratchet wheel fixed to the shaft, the handle being mounted on the shaft for rocking movement thereon, and a pawl pivotally connected to the handle and having a free end for operative association with the ratchet wheel.

5. A take-up device as claimed in claim 1, wherein the means interconnecting the handle and barrel comprises, a worm wheel fixed to the barrel, a bracket carried by the barrel, a worm carried by the handle and mounted in the bracket in mesh with the worm wheel.

References Cited in the file of this patent

UNITED STATES PATENTS

| | | |
|---|---|---|
| 1,275,042 | Kirchuber | Aug. 6, 1918 |
| 1,971,472 | Wolf | Aug. 28, 1934 |
| 2,078,051 | Berndt | Apr. 20, 1937 |
| 2,958,723 | Logan et al. | Nov. 1, 1960 |

FOREIGN PATENTS

| | | |
|---|---|---|
| 659,899 | France | Feb. 11, 1929 |